Jan. 8, 1957   J. Q. WOOD   2,776,725
CARBON BLACK COLLECTING AND CONVEYING SYSTEMS
Filed May 20, 1954   4 Sheets-Sheet 1

INVENTOR.
J. Q. Wood
BY Hudson & Young
ATTORNEYS

INVENTOR.
J. Q. Wood
BY Hudson & Young
ATTORNEYS

Jan. 8, 1957 J. Q. WOOD 2,776,725
CARBON BLACK COLLECTING AND CONVEYING SYSTEMS
Filed May 20, 1954 4 Sheets-Sheet 3

INVENTOR.
*J. Q. Wood*
BY
*Hudson & Young*
ATTORNEYS

Jan. 8, 1957 J. Q. WOOD 2,776,725
CARBON BLACK COLLECTING AND CONVEYING SYSTEMS
Filed May 20, 1954 4 Sheets-Sheet 4

INVENTOR.
J. Q. Wood
BY Hudson & Young
ATTORNEYS

United States Patent Office 2,776,725
Patented Jan. 8, 1957

2,776,725

CARBON BLACK COLLECTING AND CONVEYING SYSTEMS

James Q. Wood, Bartlesville, Okla., assignor to Phillips Petroleum Company, a corporation of Delaware Application May 20, 1954, Serial No. 431,018

28 Claims. (Cl. 183—7)

This invention relates to systems for collecting and conveying carbon black. In one aspect it relates to automatically maintaining a uniform and sufficient depth of flocculent carbon black in the form of a bed over the star valves in a carbon black collecting and conveying system to inhibit, or reduce, the passage of gas between portions of the system on opposite sides of said valves due to valve leakage under differential gas pressure. In another aspect it relates to pneumatic collection systems for carbon black. In another aspect it relates to the disposal of gas from said pneumatic collection systems. In another aspect it relates to increasing the efficiency of carbon black collection systems by recycle of carbon black in said systems.

In some aspects the present invention may be regarded as an improvement on the systems shown and claimed in the copending U. S. application, Serial No. 264,478, filed January 2, 1952, now Patent No. 2,717,658, granted Sept. 13, 1955, to Charles F. Betha, Lyle W. Pollock, and the present applicant, James Q. Wood.

The principal object of the present invention is to provide an improved carbon black collecting and conveying system.

One object is to improve present systems of collecting carbon black from carbon black separators by maintaining a uniform and sufficient depth of flocculent carbon black in the form of a bed over the top of the carbon black feeding means to inhibit, or reduce, the passage of gas in either direction through said feeding means.

Another object is to improve the operation of the electrical precipitators or other collecting means in separating carbon black from gaseous effluent containing the same in suspended form, by recycling partially agglomerated carbon black to the entrance of such separating means.

Another object is to provide a system of motors in which the motor of a carbon black moving means in a collection conduit is only actuated when there is more than a predetermined depth of flocculent carbon black in a carbon black separator and the motor of a carbon black feeding means discharging carbon black from said separator has been actuated by the level of carbon black in said separator reaching said predetermined depth.

Numerous other objects and advantages will be apparent upon reading the accompanying drawings, specification and claims.

In the drawings:

Figure 3 is a view similar to Figure 1 showing a second modification of the carbon black collecting system of Figure 1;

Figure 1:
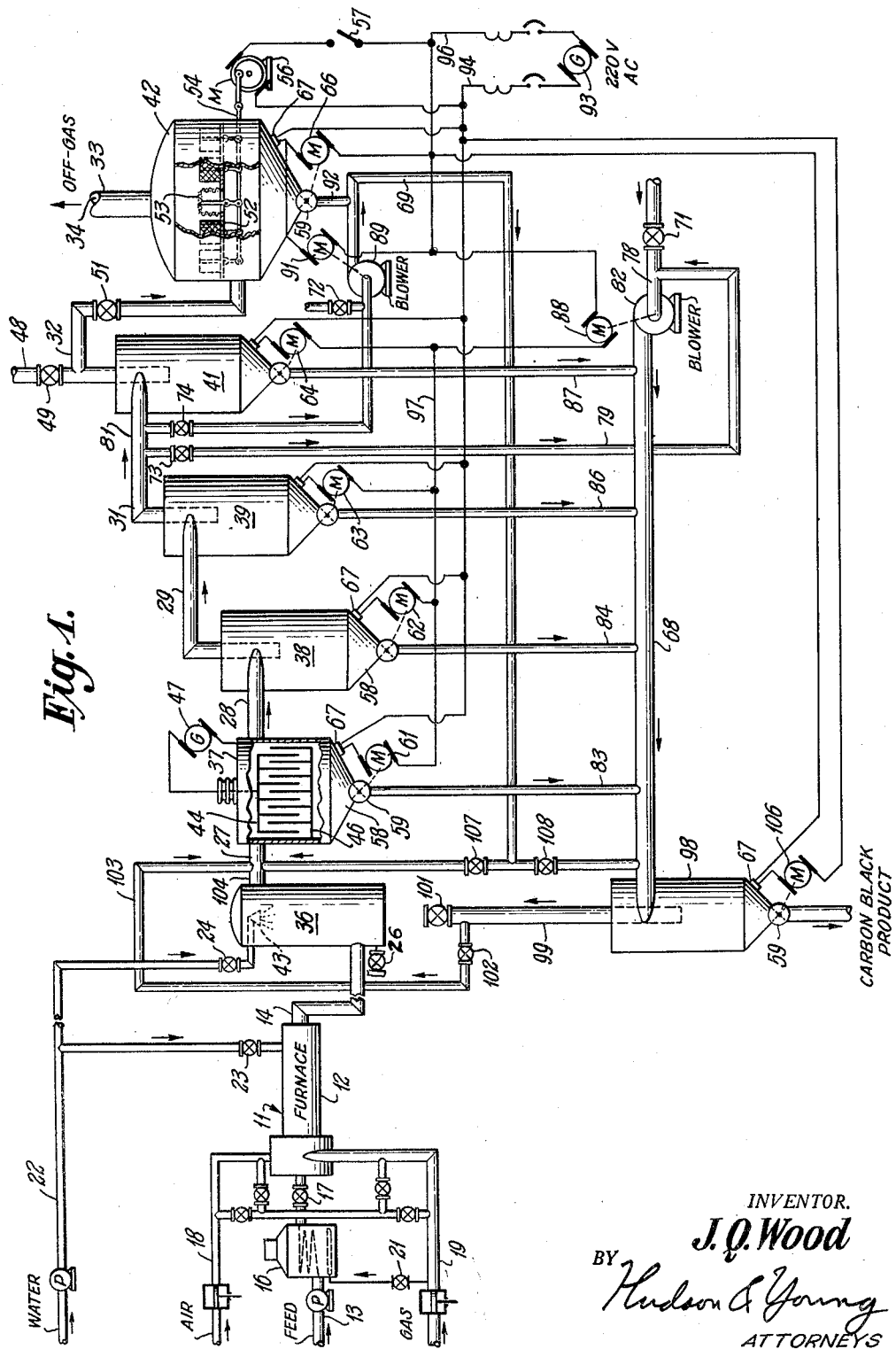
Figure 1 is a diagrammatic elevational view, with parts broken away to show details of construction, of a carbon black collecting and conveying system embodying the present invention.
Figure 2:
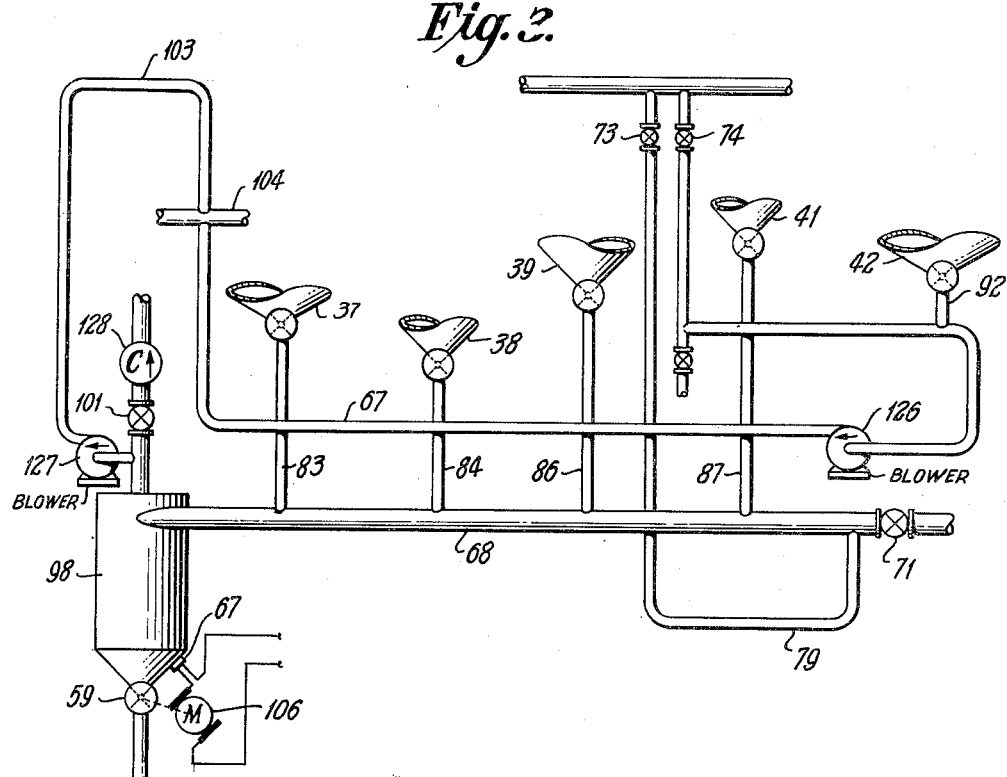
Figure 2 is a cross-sectional elevational view of a first preferred embodiment of a means actuated by the level of carbon black, which may be employed in the system of Figure 1.
Figure 2:
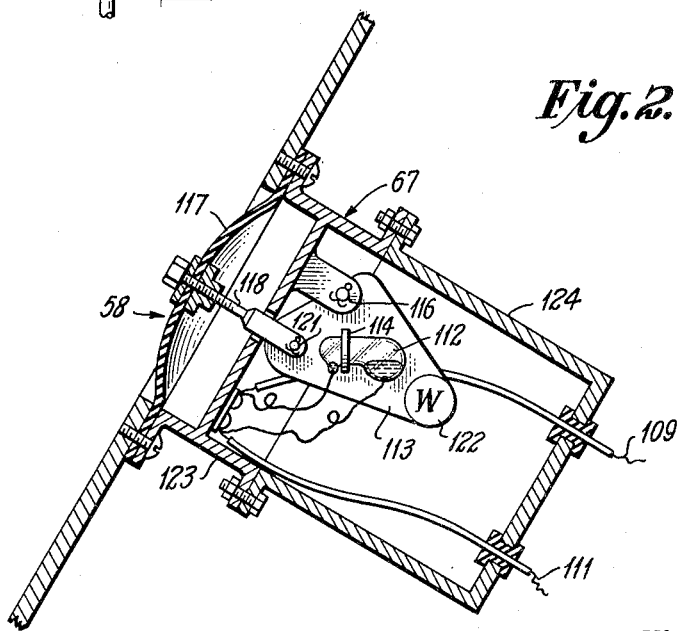
Figure 7:
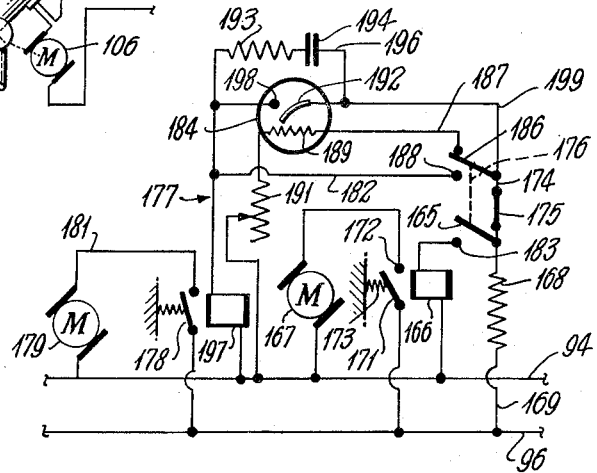
Figure 6:
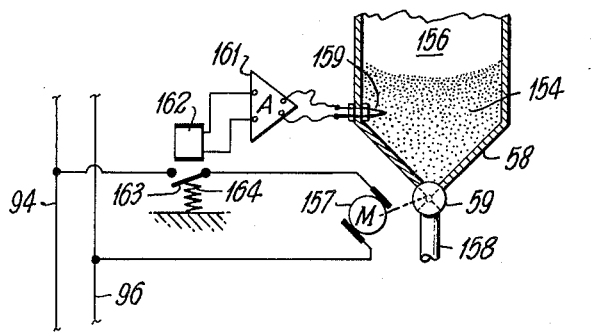

Figure 6 is a diagrammatic elevational view with parts in section of a second preferred modification of the means actuated by the level of carbon black which may be substituted for that shown in Figure 2; and Figure 7 is an electrical wiring diagram showing how relays may be employed in any of the preceding figures so that the current actuating the motors need not pass through the switch of Figure 2 as illustrated in Figure 1.

In Figure 1 is shown a carbon black collecting and conveying system, comprising in combination, a source of first gaseous effluent containing suspended carbon black, generally designated as 11. Source 11 may comprise any carbon black furnace known to the prior art such as 40 of Ayres Reissue Patent Re. 22,886 of June 3, 1947, 10 of Krejci 2,375,795 of May 15, 1945, or 10 of Krejci 2,564,700 of August 21, 1951.

Thus, source 11 comprises a furnace 12 in which a feed 13 of a carbonaceous material, preferably a hydrocarbon liquid or gas, is converted by a pyrolytic reaction and/or incomplete combustion into a gaseous effluent leaving the furnace by a discharge conduit 14. In the operation of such furnace, the feed may, if desired, be heated, and/or vaporized in a preheater 16 and sprayed, or passed in vaporized state through valve 17 into furnace 12 while air, or other free-oxygen containing gas from pipe 18 and/or gas from pipe 19 can be added to furnace 12 in desired proportion by adjustment of the valves shown in the drawing to supply additional heat and/or aid in the incomplete combustion in furnace 12. Preheater 16 may be heated by gas from valve 21, or by some other source of fuel.

While not essential to the process, it is usual to quench the effluent in discharge conduit 14 by indirect heat exchange with the atmosphere through the walls of said conduit, and in many instances to supplement such quenching by indirect heat exchange with water jackets (not shown) and/or by the direct injection of water from pipe 22 in the form of spray through valves 23 and/or 24. The amount of water added directly to the gaseous effluent in discharge conduit 14 through valves 23 and 24 is regulated so that in cooling said effluent by evaporation of said water, all of said water is completely evaporated and passes as a vapor through the system in said first gaseous effluent. This makes it unnecessary to use drain valve 26 except in emergencies.

A discharge conduit 14, 27, 28, 29, 31, 32 and 33 connects said source 11 with an outlet 34 downstream therefrom. Connected in, and forming a part of said discharge conduit, is a secondary quench chamber 36 containing a water sprayhead 43 receiving water from valve 24, and a plurality of carbon black separators 37, 38, 39, 41 and 42. Secondary quench 36 is generally used to maintain the same temperature in the discharge conduit in the summertime as in the wintertime when the atmosphere is colder, by adjustment of valve 24. While specific types of separators 37, 38, 39, 41 and 42 have been shown, any usual means for separating solids from gases by a dry separation step can be employed, and the number of separators can vary from one to as many as desired.

For the purpose of illustrating a preferred modification of the invention a specific set of carbon black separators which have been found useful in a full-sized commercial carbon black plant have been illustrated in the drawing. They consist of an electrical precipitator 37 in which said gaseous effluent is passed between pairs of oppositely charged plates or wires 44 and 46 having a direct or alternating high potential current of opposite polarity thereon generated by suitable electrical generating means 47. Due to the electrical precipitator 37, a certain amount of the carbon black is precipitated and separates as flocculent carbon black in the bottom of precipitator 37, and a certain amount of agglomeration occurs in the carbon black remaining suspended in pipe 28.

Cyclone separator 38 is formed with a central discharge pipe 29 and a tangential inlet pipe 28 tangent to the inner cylindrical surface of the cyclone separator. Some of the carbon black is thrown against the cylindrical walls of separator 38 and falls to the bottom as flocculent carbon black, but often considerable amounts of the carbon black remain suspended in the gaseous effluent and pass out through pipe 29. While in some instances one cyclone separator is enough, it has been found advantageous to use three of the same in series, namely, separators 38, 39 and 41. The percentage of carbon black removed by a cyclone separator varies with the velocity of the gaseous effluent and a good mechanical engineer can select the number, size, design and velocities involved to produce desirable results.

The remaining gaseous effluent in pipe 32 can in some instances be vented directly to the atmosphere through pipe 48 by opening valve 49 and closing valve 51, but often times there remains sufficient carbon black in the effluent gas to result in more or less of a nuisance in the neighborhood due to fall-out of the minor residual carbon black on the property of others, so it is preferred to close valve 49 and open valve 51 so that the effluent gas in pipe 32 will pass through bag filter 42 before being discharged to the atmosphere through outlet 34.

Bag filter 42 is divided into two chambers by a plate 52 having a number of holes therein covered by cloth or other gas permeable fabric 53. This fabric completes the substantially complete removal of carbon black from the off-gas which passes out of outlet 34 to the atmosphere at a temperature above the dewpoint of the contained water vapor. This off-gas comprises such gases as nitrogen, carbon dioxide, carbon monoxide, hydrogen and water vapor from water of combustion from furnace 12 and evaporated water from quenches 23 and/or 24, and usually small amounts (about 0 to 10%) of hydrocarbons.

In order to increase the efficiency of bag filter 42, it is customary to provide some type of bag shaking means 54 which is driven by a motor 56 controlled by switch 57. Each of said separators 37, 38, 39, 41 and 42 comprises a gravity collection chamber 58 as its lower portion, which may be made conical as shown to aid in the discharge of carbon black through an outlet conduit controlled by a carbon black feeder 59. Various types of carbon black feeders may be employed, the conventional type of star valves shown in the drawing being preferred. The star valve 59 is not shown in detail as it is a well known device similar to a revolving door having a paddle wheel with radial blades which allow the passage of solids by gravity as the paddle wheel rotates, while two or more of the radial paddles obstruct or substantially prevent the unregulated passage of gas through the carbon black feeder in either direction.

It has been found, however, that in the continued operation of such star valves or other types of carbon black feeders, that the necessity for providing clearance to compensate for temperature changes is such that there will be gas leakage through the same at an undesirable rate. The off-gas at 34 when mixed with a certain percentage of air from the atmosphere is an explosive mixture, and therefore, it is desired to prevent such proportions of air from getting into separators 37, 38, etc., or the off-gas getting out of these separators into other parts of the system through the carbon black feeders 59. It is a feature of the present invention to control the flow of carbon block through the carbon black feeders 59 so as to maintain a predetermined level of carbon black in said gravity collection chambers 58 sufficient to substantially eliminate any uncontrolled flow of gas through the feeders 59. This is done by providing separate motors 61, 62, 63, 64 and 66 for operating each of the carbon black feeders 59 and providing means 67 responsive to the accumulation of carbon black above a predetermined level in collection chamber 58 for energizing the respective motors of the responsive carbon black feeders 59. The accumulated bed of carbon black above the feeder 59 acts as a gas seal preventing substantial gas flow in either direction.

Figure 5:
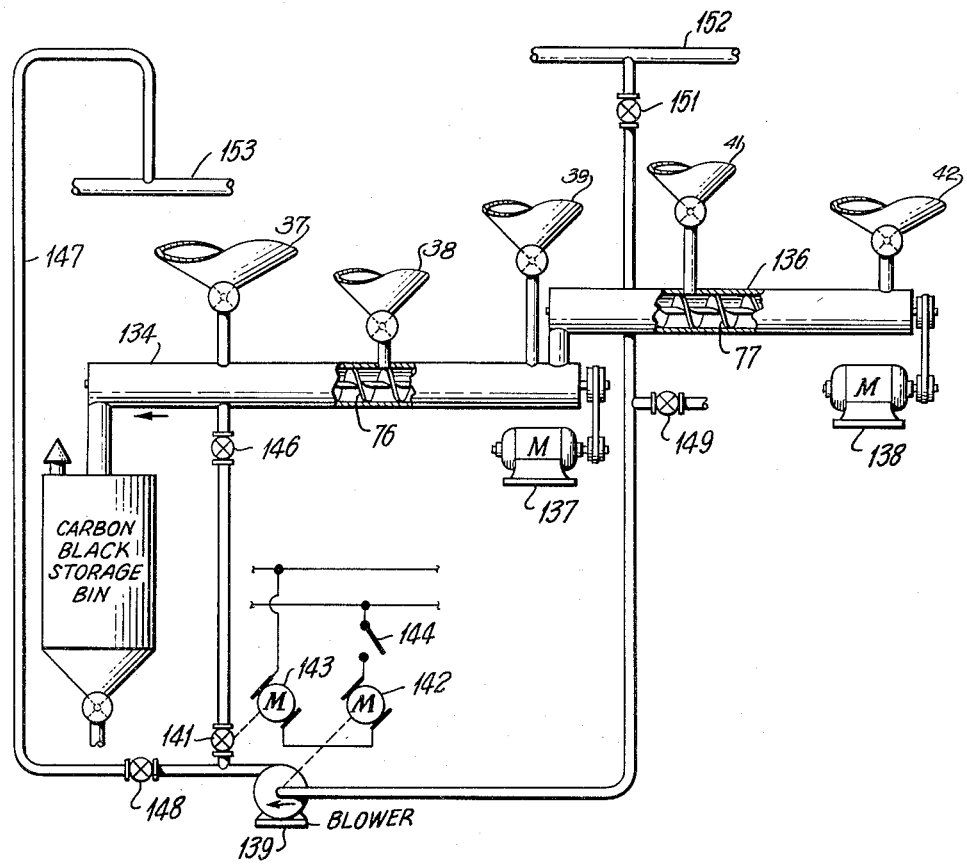
Figure 5 is a view similar to Figure 1 showing a fourth modification of the carbon black collecting system shown in Figure 1.

In order to collect the carbon black from the carbon black feeders 59 one or more collection conduits 68 and 69 are provided. These collection conduits may employ air from the atmosphere taken through valves 71 and 72, or off-gas from the system taken through valves 73 and 74, respectively, but avoiding explosive mixtures of the same, or the transfer of carbon black in the collection system may be entirely mechanical by means of screws 76 and 77 as shown in Figure 5.

In Figure 1, means comprising a source of gas 78 comprises a gas supply conduit 79 connecting said collection conduit 68 to a first point 81 in said discharge conduit 31, and a gas blower 82 is connected in said collection conduit 68 for moving the carbon black from the outlet conduits 83, 84, 86 and 87 through said collection conduit 68 with gas from said supply conduit source 79.

Gas blower 82 may be upstream, or downstream, of any or all of the collection conduits 83, 84, 86 and 87, as the blower 82 will handle carbon black as well as gas. I have found that when gas blower 82 is located upstream of any of the outlet conduits that it is the best to position the level detection means 67 higher up in gravity collection chamber 58 than if blower 82 is located downstream of the respective outlet conduit, depending on the relative gas pressure existing in the system, which pressures are easily calculated by any mechanical engineer. In one installation, it was found that a considerable amount of gas leaked in an uncontrolled manner through the star valves because the system caused a pressure differential of 2 to 12 inches of water across the valve. This is prevented by maintaining a level of about 3 to 15 feet of carbon black above the star valve 59 when blower 82 is downstream of the respective outlet conduit, or 8 to 15 feet when the blower 82 is upstream of said respective outlet conduit. These numerical values are merely given for purposes of illustration as, obviously the exact values depend on the design of the system and the pressure drops and gas velocity for which the system has been designed.

Gas blower 82 is controlled and operated by motor 88, while a similar gas blower 89 in collection conduit 69 is driven by a motor 91 to collect from outlet conduit 92 from the carbon black feeder 59 of the bag filter 42. The electrical system shown in Figure 1 comprises any usual source of power 93 which is shown supplying to wires 94 and 96 an opposite polarity with either alternating or direct current, alternating current being shown. Obviously, an electrical engineer may substitute three phase systems or other equivalents for power source 93. It will be noted that motor 56 is started and stopped independently of the rest of the system by means of switch 57, but that the operation of the other motors is automatic.

It will be noted that level indicating device 67 is connected to wire 94 and that motors 66 and 91 are connected in parallel between switch 67 and the return wire 96, so that motors 66 and 91 do not operate until there is an excess level of carbon black in the bottom of bag filter 42, whereupon they commence operation and carbon black is fed through carbon black feeder 59 while blower 89 conveys the same through collection conduit 69.

Similarly motors 61, 62, 63 and 64 are in parallel between wires 94 and 97, each in series with its respective carbon black level switch 67, while motor 88 is in series with wires 97 and 96, so that when any one of switches 67 starts its respective carbon black feeder 59, motor 88 will immediately start driving blower 82 and will drive the same as long as any one or more of carbon black feeders 59 is operated. As soon as all of the carbon black feeders driven by motors 61, 62, 63 and 64 have stopped, motor 88 also stops.

The carbon black in collection conduit 68 is collected by any suitable carbon black collector 98 which preferably is a single cyclone separator as shown. The carbon black is so well agglomerated and so concentrated in the gas in collection conduit 68 that substantially all of the same is removed by passing tangentially into cylindrical chamber 98, and the gas passes out through an axial pipe 99 and can be discharged to the atmosphere through valve 101, but preferably valve 101 is closed and the gas is returned to the system through valve 102 and bleed conduit 103 to a suitable point 104 in the discharge conduit 27. Whatever amount of agglomerated carbon black remains in gas pipe 99 will be found to aid the operation of all of the separators 37, 38, 39, 41 and 42, but especially the operation of electrical precipitators 37, by forming larger nuclei for the carbon black to gather on. The amount of agglomerated carbon black in pipe 99 can be adjusted by the design of collector 98 and the velocity of gas through blower 82. Obviously if any attempt is to be made to return the gas in 99 to the atmosphere through valve 101, the separation must be very excellent in collector 98, but if, as preferred, the gas in 99 is returned to the system through a valve 102, a considerable amount of carbon black can pass through pipe 99, and this carbon black is not lost, because it improves the action of the carbon black separators and is recovered by them for return to the collection conduit 68. The point of return 104 can be upstream of at least one of the separators, such as in pipe 32 upstream of bag filter 42, but it is preferred to have it return to conduit 27 ahead of electrical precipitator 37 because the effect of the recycled agglomerated black is most beneficial to the efficiency in agglomerating and/or separating the carbon black in the electrical precipitator 37.

The carbon black collecting in the bottom of collector 98 may be stored there, or removed for further storage by a carbon black feeder 59 driven by motor 106 which is independently actuated by carbon black level switch 67.

The carbon black being moved in collection conduit 69 by blower 89, which blower may be either upstream or downstream of outlet conduit 92, may be directly returned to point 104 in the discharge conduit through valve 107, or passed to collector 98 through valve 108, and/or both in any desired proportion.

In Figure 2, an enlarged view of the carbon black level operated switch 67 is shown in greater detail. An electrical circuit between wires 109 and 111 is completed through tilting mercury switch 112 in one position and the circuit is broken in another position. Switch 112 is secured in position on plate 113 by securing means 114. Plate 113 pivots around pin 116 in response to the pressure exerted by the carbon black in space 58 on a flexible diaphragm 117 secured to plate 113 by connection rod 118 and pivot 121, and switch 112 is biased into open position by weight 122 which opposes the pressure of the carbon black on diaphragm 117, and which returns the switch to open position whenever the carbon black level falls to the predetermined point in space 58. Switch 67 may be provided with suitable supporting means 123 and cover 124, if desired.

Figure 3 is a view similar to Figure 1 showing a second modification of the carbon black collecting system of Figure 1 in which the gas blowers or compressors 126, 127, and 128 are located downstream of the outlet conduits 127 and blowers 127 and 128 are located downstream of the collector 98. As all other features are the same as in Figure 1, the corresponding parts are given the same reference numerals as in Figure 1.

Figure 4:
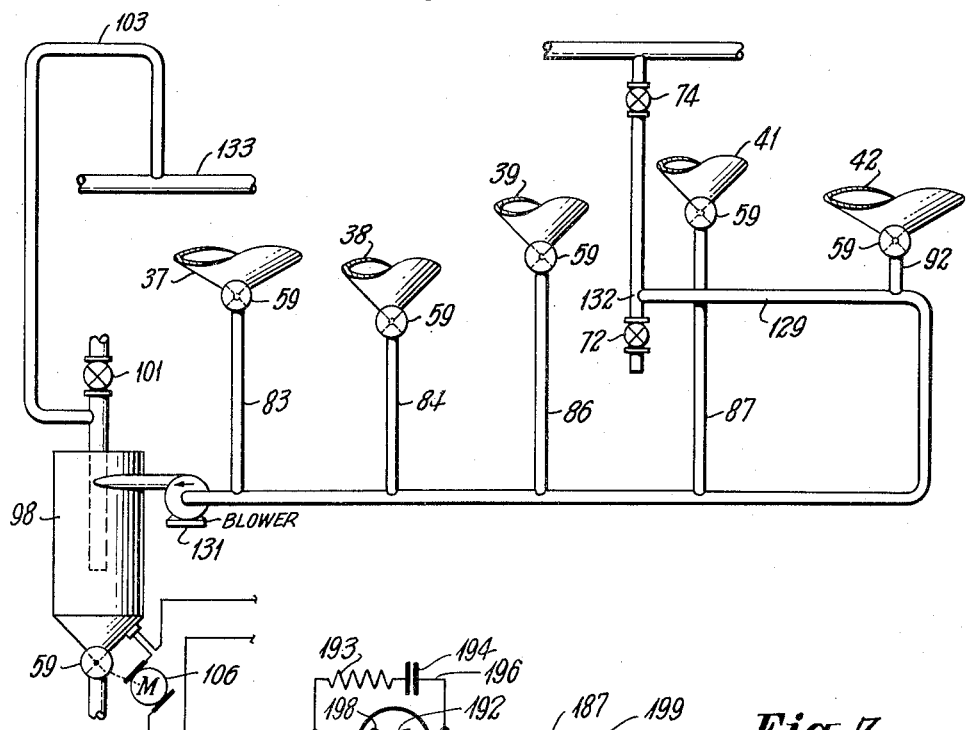
Figure 4 is a view similar to Figure 1 showing a third modification of the carbon black collecting system of Figure 1.

Figure 4 is a view similar to Figure 1 showing a third modification of the carbon black collecting system of Figure 1 in which there is a single collection conduit 129 and a single gas blower 131, which gas blower 131 can be located anywhere between points 132 and 133 with equal facility, subject to the mechanical engineering considerations discussed above. All the other structure in Figure 4 is the same as in Figure 1, and is given the same reference numerals.

Figure 5 is a view similar to Figure 1 showing a fourth modification of the carbon black collecting system of Figure 1 employing mechanical conveying means in the collection conduits 134 and 136 comprising screws 76 and 77 driven by motors 137 and 138 respectively. In this modification there would be no normal recycle of carbon black through the bleed conduit 103 of Figure 1, because gas is not used for conveying, and therefore if it is desired to recycle carbon black in order to increase the efficiency of separator 37, for example, a separate system comprising blower 139 and carbon black feeder 141 driven by motors 142 and 143 respectively in response to the operation of switch 144 is necessary, carbon black being withdrawn from collection conduit 134 through valve 146 and carbon black feeder 141 and returned to the discharge conduit through line 147 when valve 148 is opened and air is being supplied to blower 139 through valve 149, or off-gas is being supplied through valve 151. While blower 139 is shown in a preferred position it should be understood that blower 139 can be located any where from point 152 to point 153. The other elements in Figure 5 being the same as corresponding parts of Figure 1, they are given the same reference numerals.

Figure 6 shows a second modification of the means actuated by the level of carbon black which may be substituted for pressure switch 67 in Figures 1 and 2, and in the other figures of the drawing. This level control is operated by temperature, it being well known that a pile of collected flocculent carbon black 154 tends to cool off in the collection space 58 and form an insulating layer. As the moving gas 156 above the carbon black 154 is being replenished from furnace 12 and is hotter than the carbon black in pile 154, this difference in temperature can be used to operate motor 157 and drive the usual carbon black feeder 59 to control discharge of the carbon black into outlet conduit 158. A suitable thermocouple 159, or temperature bulb or other known temperature responsive means for detection of temperature at this predetermined point may be employed as a transducer, the output of which is amplified by suitable amplifier 161 to operate solenoid 162 of solenoid switch 163 which is normally biased in open position by suitable biasing means such as spring 164 to complete the circuit between power wires 94 and 96 through motor 157.

Figure 7 is illustrative of further refinements which can be made in the electrical systems of any of the preceding Figures 1 to 6. Whenever it is found undesirable to have the relatively large current necessary to operate any one, or more, of the star valve motors 61, 62, 63, 64, 66, 106 or 143, and/or any of the blower motors 88, 91 or 142, pass through the switch element 112 of pressure switch 67, relay switch circuits are provided as shown in Figure 7.

In Figure 7, power wires 94 and 96 are the same power wires having the same numbers as in Figure 1. The lower switch blade 165 represents the carbon black level actuated switch, such as mercury switch 112 of pressure switch 67 of Figure 2. Motor 167 represents the load of one, or more, of the star valve motors 61, 62, 63, 64, 66, 106 or 143, either alone, or in series with, or in parallel with, the corresponding blower motors 88, 91, or 142. The closing of switch 165 completes a high resistance circuit from wire 94 through solenoid 166, resistance 168 and wire 169 to the other power wire 96. In such a circuit resistance 168 (which could also be provided by giving solenoid 166 sufficient resistance itself and thus omitting separate resistances 168) limits the flow of current through switch 165 to that amount of current necessary to cause solenoid 166 to close switch 171 closed against contact 172 by overcoming the bias of the spring 173 tending to hold switch 171 open. The closing of switch 171 completes a low resistance, relatively high current, circuit from wire 96 through switch 171, contact 172, and motor (or motors) 167 back to wire 94. In the operation of one or more motors connected as a load at 167 (if a plurality of motors is used at this point it can be in series or parallel as discussed above), when switch 165 is a single-pole single-throw switch like 112 of Figure 2, wire 174 should be regarded as cut by opening switch 175, and gang-switch arm 176 and all higher numbered parts of Figure 7 would not be present.

However, in all the embodiments of the invention illustrated up to the present point, it will be noted that the current to the star valve motors 61, 62, 63, 64, 66, 106 and 143, and to the blower motors 88, 91 or 142 servicing the respective star valve motors is interrupted at the same instant by the opening of their respective switch 67, and these motors are supplied with current at the same instant when their respective switch 67 closes. These are all operable systems if the various conduits, such as 68, 83, 84, 86, 87, 69 and 92, etc. involved are not too long. In some installations, however, the stopping of the blower motors at the time the respective star valve motors stop would result in some accumulation of carbon black in the conveying conduits mentioned above, which accumulation might not be properly handled immediately upon the next period of starting of the respective blower motors. This difficulty can be avoided in several ways which will be discussed below.

One way to avoid this difficulty is to design the star valves and their respective blowers, and their respective motors, so that the star valves will have less annular inertia and more friction than the blowers, so that the blowers will continue to blow at a gradually decreasing rate for a sufficient time after the current has been cut off of their motors to completely clear the conveying conduits of carbon black after the respective star valve, or star valves, have ceased rotating and thereby have ceased feeding carbon black, due to the cutting off of current to the motors of the star valves and the blowers at the same instant.

However, it is preferred, as shown in Figure 7, when such a conduit clearance problem tends to arise, to energize the star valve motors and respective blower motors at the same instant, but to break the circuit supplying current to the respective blower motors only after a short period of time has elapsed after all the respective star valve motors have stopped. This can be done by the complete circuit shown in Figure 7 by providing a second time delay relay generally designated as 177 operating switch 178 (similar to switch 171) to supply current to blower motor 179 by closing low resistance circuit 181 at the same instant as switch 171 closes, but delaying the opening of switch 178 until a period of time, for example several minutes, has elapsed after switch 171 opens.

While this could be accomplished by placing a mechanical one-way dashpot (not shown) on switch 178, in which case wire 182 can be connected to contact 183 and all higher numbered parts as well as parts 174 and 176 of Figure 7 omitted, it is preferred to employ an entirely electrical time retarded relay 177 as shown. While there are other retarded electrical relays available, it is preferred to use in relay 177 a thermostatic delay switch 184 in the complete circuit of Figure 7 which will be described in the next paragraph.

For example, a second mercury switch like 112 can be mounted on the opposite side of plate 113 shown in Figure 2, and this second mercury switch is represented by double-pole single-throw switch 186. Of course, in this mercury switch, there would be three mercury receiving depressions in a line (not shown) instead of the two depressions of switch 112, and switch 186 represents an electrode in the central depression, and contacts 187 and 188 represent the electrodes in the right and left hand depressions as they would be viewed in Figure 2.

Inside chamber 184, which is preferably evacuated and/or filled with inert gas, such as nitrogen, is located an electrical resistance heating element 189, the rate of heating of which may be varied by rheostat 191, which heats a bimetallic arcuate single-pole single-throw thermostat switch 192.

While not necessary to the operation of the device, it is preferred to place a resistance 193 and condenser 194 connected in series in shunt 196 with switch 192 to suppress sparks upon opening of the switch 192. Obviously, similar sparks suppressing shunts (not shown) like 196 can be placed across switch 165 and across each branch of switch 186 if desired.

Starting with the parts in the position shown in Figure 7, a small current is constantly flowing from wire 96 through resistance 168, switch 186, wire 187, heating element 189, and rheostat 191 to wire 94. The heat from resistance 189 has heated and bent bimetallic switch 192 and caused it to pull down from contact 198 opening the circuit in wire 199. The amount of current to heat 189 is very small. When there is a sufficient accumulation of carbon black above a predetermined level in one of the collection chambers 58, the extra weight of this carbon black moves diaphragm 117 outward of said chamber as shown in Figure 2, which closes switch 165 against contact 183 and moves switch 186 from contact 187 against contact 188 in Figure 7. A relatively small current then flows from wire 96 through resistance 168, switch 165, and solenoid 166 to wire 94, part of the current flowing through resistance 168 also flowing through switch 186, wire 182, and solenoid 197 to wire 94. Solenoids 166 and 197 close switches 171 and 178 respectively at the same instant, allowing large current flows from wire 96 to wire 94 through motors 167 and 179 and their respective switches 171 and 178. Therefore, motor 167 actuates a star valve feeding carbon black out of the respective chamber 58 at the same instant that motor 179 starts driving the respective blower to convey the carbon black away. Switch 186 having broken contact with contact 187, heater 189 receives no current and in a few minutes the bimetallic switch 192 cools off and becomes straightened out and in contact with contact 198. Both motors 167 and 179 continue to run until the level of carbon black changes sufficiently for the biasing force 122 in Figure 2 to move switches 165 and 186 so that 165 is opened and 186 moves from contact 188 to contact 187. The construction of the elements in Figure 2 are such that there is considerable lag in the movement of the plate 113 in response to changes in carbon black level. When switch 165 opens the current in solenoid 166 is immediately interrupted releasing switch 171 which is opened by spring 173 and motor 167 stops. The current in solenoid 197 however continues to be supplied through wire 199 and switch 192.

However, switch 186 now being in contact with contact 187, current is again supplied to heater 189, which warms bimetallic element 192 and causes the same to curve away from contact 198 at a rate set by rheostat 191. Therefore, when a sufficient period of time has elapsed (the exact period of time being controlled by the setting of rheostat 191) arm 192 breaks its connection with contact 198 and the current then fails in solenoid 197, and at this time switch 178 opens and blower motor 179 stops. When an opening occurs between arm 192 and contact 198, the current passes into one side of condenser 194 in a temporary surge, which condenser thus prevents any substantial sparks between elements 192 and 198. This returns the electrical system to the original position in the cycle described, with the parts again in the positions shown in Figure 7. The next time a sufficient head of carbon black accumulates above diaphragm 117 of Figure 2 the cycle is repeated.

Obviously, the time it takes for enough carbon black to accumulate to throw switch 186 from contact with 187 to contact with 188 must be greater than the time needed for switch 192 to cool off, straighten out, and contact 193, and the movement of switch 186 should be fairly quick and deliberate, but obviously the construction of Figure 2 is such that this occurs.

Obviously, any electrical engineer can utilize the system shown in Figure 7 and apply the same to any of the preceding figures of the drawing.

While means for starting and stopping the blower motors 88, 91 or 142 along with the respective star valve motors 61 to 64, 66 and 143 of the star valves feeding carbon black to the conduit blown by the respective blower, in some instances it may be desirable to have the blower motor on an independent circuit with a hand switch control so that it blows continuously while the star valves feed intermittently into the conduit, especially where a number of star valves feed to one blower conduit.

The operation of the system shown in the drawing has been fully explained with reference to each figure above. While certain illustrative embodiments of my invention have been shown for purposes of illustration, the invention is not limited thereto.

Having described my invention, I claim:

1. A carbon black collecting and conveying system, comprising in combination, a source of a gaseous effluent containing suspended carbon black, a discharge conduit connecting said source with an outlet downstream therefrom, a carbon black separator connected downstream of said source in said discharge conduit adapted to separate some of the carbon black from said effluent, said separator comprising a gravity collection chamber having an outlet conduit for carbon black, a carbon black feeder controlling flow of carbon black through said outlet conduit and thereby the level of carbon black in said chamber, a collection conduit connected to said outlet conduit, means comprising a source of gas comprising a gas supply conduit connecting said collection conduit to said discharge conduit and a gas blower connected in said collection conduit for moving said carbon black from said outlet conduit through said collection conduit with gas from said gas supply conduit, a carbon black collector in said collection conduit downstream of said outlet conduit for collecting some of the carbon black being moved in said collection conduit, a bleed conduit connected to said collection conduit downstream of said carbon black collector and connected to said discharge conduit upstream of said carbon black separator, and means actuated by the level of carbon black in said chamber for actuating said carbon black feeder to maintain a predetermined level of carbon black above said carbon black feeder.

2. A carbon black collecting and conveying system, comprising in combination, a source of a gaseous effluent containing suspended carbon black, a discharge conduit connecting said source with an outlet downstream therefrom, a carbon black separator connected downstream of said source in said discharge conduit adapted to separate some of the carbon black from said effluent, said separator comprising a gravity collection chamber having an outlet conduit for carbon black, a carbon black feeder controlling flow of carbon black through said outlet conduit and thereby the level of carbon black in said chamber, a collection conduit connected to said outlet conduit, means comprising a source of gas and a gas blower connected in said collection conduit for moving said carbon black from said outlet conduit through said collection conduit with gas from said source, a carbon black collector in said collection conduit downstream of said outlet conduit for collecting some of the carbon black being moved in said collection conduit, a bleed conduit connected to said collection conduit downstream of said carbon black collector and connected to said discharge conduit upstream of said carbon black separator, and means actuated by the level of carbon black in said chamber for actuating said carbon black feeder to maintain a predetermined level of carbon black above said carbon black feeder.

3. A carbon black collecting and conveying system, comprising in combination a source of a gaseous effluent containing suspended carbon black, a discharge conduit connecting said source with an outlet downstream therefrom, a carbon black separator connected downstream of said source in said discharge conduit adapted to separate some of the carbon black from said effluent, said separator comprising a gravity collection chamber having an outlet conduit for carbon black, a carbon black feeder controlling flow of carbon black through said outlet conduit and thereby the level of carbon black in said chamber, a collection conduit connected to said outlet conduit, means for moving said carbon black from said outlet conduit through said collection conduit, a carbon black collector in said collection conduit downstream of said outlet conduit for collecting some of the carbon black being moved in said collection conduit, a bleed conduit connected to said collection conduit downstream of said carbon black collector and connected to said discharge conduit upstream of said carbon black separator, and means actuated by the level of carbon black in said chamber for actuating said carbon black feeder to maintain a predetermined level of carbon black above said carbon black feeder.

4. A carbon black collecting and conveying system, comprising in combination, a source of a gaseous effluent containing suspended carbon black, a discharge conduit connecting said source with an outlet downstream therefrom, a carbon black separator connected downstream of said source in said discharge conduit adapted to separate some of the carbon black from said effluent, said separator comprising a gravity collection chamber having an outlet conduit for carbon black, a carbon black feeder controlling flow of carbon black through said outlet conduit and thereby the level of carbon black in said chamber, a collection conduit connected to said outlet conduit, means comprising a source of gas comprising a gas supply conduit connecting said collection conduit to said discharge conduit and a gas blower connected in said collection conduit for moving said carbon black from said outlet conduit through said collection conduit with gas from said gas supply conduit, a bleed conduit connected to said collection conduit and connected to said discharge conduit upstream of said carbon black separator, and means actuated by the level of carbon black in said chamber for actuating said carbon black feeder to maintain a predetermined level of carbon black above said carbon black feeder.

5. A carbon black collecting and conveying system, comprising in combination, a source of a gaseous effluent containing suspended carbon black, a discharge conduit connecting said source with an outlet downstream therefrom, a carbon black separator connected downstream of said source in said discharge conduit adapted to separate some of the carbon black from said effluent, said separator comprising a gravity collection chamber having an outlet conduit for carbon black, a carbon black feeder controlling flow of carbon black through said outlet conduit and thereby the level of carbon black in said chamber, a collection conduit connected to said outlet conduit, means comprising a source of gas comprising a gas supply conduit connecting said collection conduit to said discharge conduit and a gas blower connected in said collection conduit for moving said carbon black from said outlet conduit through said collection conduit with gas from said gas supply conduit, a carbon black collector in said collection conduit downstream of said outlet conduit for collecting some of the carbon black being moved in said collection conduit, a bleed conduit connected to said collection conduit downstream of said carbon black collector, and means actuated by the level of carbon black in said chamber for actuating said carbon black feeder to maintain a predetermined level of carbon black above said carbon black feeder.

6. A carbon black collecting and conveying system, comprising in combination, a source of a gaseous effluent containing suspended carbon black, a discharge conduit connecting said source with an outlet downstream therefrom, a carbon black separator connected downstream of said source in said discharge conduit adapted to separate some of the carbon black from said effluent, said separator comprising a gravity collection chamber having an outlet conduit for carbon black, a carbon black feeder controlling flow of carbon black through said outlet conduit and thereby the level of carbon black in said chamber, a collection conduit connected to said outlet conduit, means comprising a source of gas comprising a gas supply conduit connecting said collection conduit to said discharge conduit and a gas blower connected in said collection conduit for moving said carbon black from said outlet conduit through said collection conduit with gas from said gas supply conduit, a carbon black collector in said collection conduit downstream of said outlet conduit for collecting some of the carbon black being moved in said collection conduit, and means actuated by the level of a carbon black in said chamber for actuating said carbon black feeder to maintain a predetermined level of carbon black above said carbon black feeder.

7. A carbon black collecting and conveying system, comprising in combination, a source of a gaseous effluent containing suspended carbon black, a discharge conduit connecting said source with an outlet downstream therefrom, a carbon black separator connected downstream of said source in said discharge conduit adapted to separate some of the carbon black from said effluent, said separator comprising a gravity collection chamber having an outlet conduit for carbon black, a carbon black feeder controlling flow of carbon black through said outlet conduit and thereby the level of carbon black in said chamber, a collection conduit connected to said outlet conduit, means comprising a source of gas and a gas blower connected in said collection conduit for moving said carbon black from said outlet conduit through said collection conduit with gas from said source of gas, a carbon black collector in said collection conduit downstream of said outlet conduit for collecting some of the carbon black being moved in said collection conduit, a bleed conduit connected to said collection conduit downstream of said carbon black collector, and means actuated by the level of carbon black in said chamber for actuating said carbon black feeder to maintain a predetermined level of carbon black above said carbon black feeder.

8. A carbon black collecting and conveying system, comprising in combination, a source of a gaseous effluent containing suspended carbon black, a discharge conduit connecting said source with an outlet downstream therefrom, a carbon black separator connected downstream of said source in said discharge conduit adapted to separate some of the carbon black from said effluent, said separator comprising a gravity collection chamber having an outlet conduit for carbon black, a carbon black feeder controlling flow of carbon black through said outlet conduit and thereby the level of carbon black in said chamber, a collection conduit connected to said outlet conduit, means comprising a source of gas and a gas blower connected in said collection conduit for moving said carbon black from said outlet conduit through said collection conduit with gas from said source of gas, a bleed conduit connected to said collection conduit, and means actuated by the level of carbon black in said chamber for actuating said carbon black feeder to maintain a predetermined level of carbon black above said carbon black feeder.

9. A carbon black collecting and conveying system, comprising in combination, a source of a gaseous effluent containing suspended carbon black, a discharge conduit connecting said source with an outlet downstream therefrom, a carbon black separator connected downstream of said source in said discharge conduit adapted to separate some of the carbon black from said effluent, said separator comprising a gravity collection chamber having an outlet conduit for carbon black, a carbon black feeder controlling flow of carbon black through said outlet conduit and thereby the level of carbon black in said chamber, a collection conduit connected to said outlet conduit, means for moving said carbon black from said outlet conduit through said collection conduit, a carbon black collector in said collection conduit downstream of said outlet conduit for collecting some of the carbon black being moved in said collection conduit, a bleed conduit connected to said collection conduit downstream of said carbon black collector, and means actuated by the level of carbon black in said chamber for actuating said carbon black feeder to maintain a predetermined level of carbon black above said carbon black feeder.

10. A carbon black collecting and conveying system, comprising in combination, a source of a gaseous effluent containing suspended carbon black, a discharge conduit connecting said source with an outlet downstream therefrom, a carbon black separator connected downstream of said source in said discharge conduit adapted to separate some of the carbon black from said effluent, said separator comprising a gravity collection chamber having an outlet conduit for carbon black, a carbon black feeder controlling flow of carbon black through said outlet conduit and thereby the level of carbon black in said chamber, a collection conduit connected to said outlet conduit means comprising a source of gas and a gas blower connected in said collection conduit for moving said carbon black from said outlet conduit through said collection conduit with gas from said source, a carbon black collector in said collection conduit downstream of said outlet conduit for collecting some of the carbon black being moved in said collection conduit, and means actuated by the level of carbon black in said chamber for actuating said carbon black feeder to maintain a predetermined level of carbon black above said carbon black feeder.

11. A carbon black collecting and conveying system, comprising in combination, a source of a gaseous effluent containing suspended carbon black, a discharge conduit connecting said source with an outlet downstream therefrom, a carbon black separator connected downstream of said source in said discharge conduit adapted to separate some of the carbon black from said effluent, said separator comprising a gravity collection chamber having an outlet conduit for carbon black, a carbon black feeder controlling flow of carbon black through said outlet conduit and thereby the level of carbon black in said chamber, a collection conduit connected to said outlet conduit, means for moving said carbon black from said outlet conduit through said collection conduit, a carbon black collector in said collection conduit downstream of said outlet conduit for collecting some of the carbon black being moved in said collection conduit, and means actuated by the level of carbon black in said chamber for actuating said carbon black feeder to maintain a predetermined level of carbon black above said carbon black feeder.

12. A carbon black collecting and conveying system, comprising in combination, a source of a gaseous effluent containing suspended carbon black, a discharge conduit connecting said source with an outlet downstream therefrom, a carbon black separator connected downstream of said source in said discharge conduit adapted to separate some of the carbon black from said effluent, said separator comprising a gravity collection chamber having an outlet conduit for carbon black, a carbon black feeder controlling flow of carbon black through said outlet conduit and thereby the level of carbon black in said chamber, a collection conduit connected to said outlet conduit, means for moving said carbon black from said outlet conduit through said collection conduit, and means actuated by the level of carbon black in said chamber for actuating said carbon black feeder to maintain a predetermined level of carbon black above said carbon black feeder.

13. The combination of claim 12 in which the means actuated by the level of carbon black in said chamber comprises a flexible diaphragm forming a portion of the wall of said chamber, means biasing said diaphragm inwardly of said chamber, and a switch deactuated by said biasing means and actuated by the weight of carbon black in said chamber overcoming said biasing means and moving said diaphragm outwardly of said chamber when the level of said carbon black is over said diaphragm, said carbon black feeder comprising a motor energized and deenergized in response to actuation and deactuation respectively of said switch.

14. The combination of claim 12 in which the means actuated by the level of carbon black in said chamber comprising a temperature responsive means at a fixed point in said chamber disposed to give different signals when covered by carbon black and when exposed to said gaseous effluent, and means to amplify said signals and use the same to control the operation of said carbon black feeder.

15. The combination of claim 12 in which said carbon black feeder is driven by a first motor, said means for moving said carbon black through said collection outlet is driven by a second motor, and said means actuated by the level of carbon black in said chamber actuates both said motors simultaneously by connecting them both in parallel to a source of power.

16. The combination of claim 12 in which said carbon black feeder is driven by a first motor, said means for moving said carbon black through said collection outlet is driven by a second motor, and said means actuated by the level of carbon black in said chamber actuates both said motors simultaneously by connecting them both in series to a source of power.

17. A carbon black collecting and conveying system, comprising in combination, a source of a gaseous effluent containing suspended carbon black, a discharge conduit connecting said source with an outlet downstream therefrom, a plurality of carbon black separators connected in series in said discharge conduit downstream of said source, the last of said separators in a downstream direction being a bag filter, each separator having an outlet conduit for carbon black, a separate carbon black feeder comprising a motor controlling flow of carbon black through each outlet conduit, a first collection conduit connected to all of said outlet conduits except that of said bag filter, a second collection conduit connected to said bag filter and discharging into said discharge conduit upstream of at least one of said carbon black separators, separate means comprising a motor for moving carbon black through each of said collection conduits, a power source, means responsive to a predetermined level of carbon black in each of said separators except said bag filter for energizing the motor of the carbon black feeder in its respective outlet conduit and the motor of the means for moving carbon black through said first collection conduit from said power source, and means responsive to a predetermined level in said bag filter for energizing the motor of the carbon black feeder in the bag filter outlet conduit and the motor of the means for moving carbon black through said second collection conduit.

18. A carbon black collecting and conveying system, comprising in combination, a source of a gaseous effluent containing suspended carbon black, a discharge conduit connecting said source with an outlet downstream therefrom, a plurality of carbon black separators connected in series in said discharge conduit downstream of said source, each separator having an outlet conduit for carbon black, a separate carbon black feeder comprising a motor controlling flow of carbon black through each outlet conduit, a collection conduit connected to all of said outlet conduits, means comprising a motor for moving carbon black through said collection conduit, a power source, and means responsive to a predetermined level of carbon black in each of said separators for energizing the motor of the carbon black feeder in its respective outlet conduit and the motor of the means for moving carbon black through said collection conduit from said power source.

19. A carbon black collecting and conveying system, comprising in combination, a source of gaseous effluent containing suspended carbon black, a discharge conduit connecting said source with an outlet downstream therefrom, an electrical precipitator connected downstream of said source in said discharge conduit, a carbon black separator connected downstream of said precipitator in said discharge conduit, both said separator and said precipitator comprising a gravity collection chamber having an outlet conduit for carbon black and adapted to separate some of the carbon black from said effluent, a carbon black feeder in each of said outlet conduits to control flow of carbon black through said outlet conduits and thereby the level of carbon black in said separator and said precipitator, a collection conduit connected to a plurality of said outlet conduits, means comprising a source of gas comprising a gas supply conduit connecting said collection conduit to said discharge conduit and a gas blower connected in said collection conduit for moving said carbon black from said outlet conduits through said collection conduit with gas from said gas supply conduit, a carbon black collector in said collection conduit downstream of said outlet conduits for collecting some of the carbon black being moved in said collection conduit, a bleed conduit connected to said collection conduit downstream of said carbon black collector and connected to said discharge conduit upstream of said precipitator, and means in each of said chambers actuated by the level of carbon black therein for actuating said carbon black feeders to maintain a predetermined level of carbon black above said carbon black feeders.

20. A carbon black collecting and conveying system, comprising in combination, a source of gaseous effluent containing suspended carbon black, a discharge conduit connecting said source with an outlet downstream therefrom, an electrical precipitator connected downstream of said source in said discharge conduit, a carbon black separator connected downstream of said precipitator in said discharge conduit, said separator and said precipitator both comprising a gravity collection chamber having an outlet conduit for carbon black and adapted to separate some of the carbon black from said effluent, a carbon black feeder in each of said outlet conduits to control flow of carbon black through said outlet conduits and thereby the level of carbon black in said separator and said precipitator, a collection conduit connected to a plurality of said outlet conduits, means comprising a source of gas and a gas blower connected in said collection conduit for moving said carbon black from said outlet conduits through said collection conduit with gas from said source, a carbon black collector in said collection conduit downstream of said outlet conduits for collecting some of the carbon black being moved in said collection conduit, a bleed conduit connected to said collection conduit downstream of said carbon black collector and connected to said discharge conduit upstream of said precipitator, and means in each of said chambers actuated by the level of carbon black therein for actuating said carbon black feeders to maintain a predetermined level of carbon black above said carbon black feeders.

21. A carbon black collecting and conveying system, comprising in combination, a source of gaseous effluent containing suspended carbon black, a discharge conduit connecting said source with an outlet downstream therefrom, an electrical precipitator connected downstream of said source in said discharge conduit, a carbon black separator connected downstream of said precipitator in said discharge conduit, said separator and said precipitator both having a gravity collection chamber having an outlet conduit for carbon black and adapted to separate some of the carbon black from said effluent, a carbon black feeder in each of said outlet conduits to control flow of carbon black through said outlet conduits and thereby the level of carbon black in said separator and said precipitator, a collection conduit connected to a plurality of said outlet conduits, means for moving said carbon black from said outlet conduits through said collection conduit, a carbon black collector in said collection conduit downstream of said outlet conduits for collecting some of the carbon black being moved in said collection conduit, a bleed conduit connected to said collection conduit downstream of said carbon black collector and connected to said discharge conduit upstream of said precipitator, and means in each of said chambers actuated by the level of carbon black therein for actuating said carbon black feeders to maintain a predetermined level of carbon black above said carbon black feeders.

22. A carbon black collecting and conveying system, comprising in combination, a source of a gaseous effluent containing suspended carbon black, a discharge conduit connecting said source with an outlet downstream therefrom, an electrical precipitator connected downstream of said source in said discharge conduit, a plurality of carbon black separators connected in series in said discharge conduit downstream of said precipitator, the last of said separators in a downstream direction being a bag filter, each separator and said precipitator having an outlet conduit for carbon black, a separator carbon black feeder comprising a motor controlling flow of carbon black through each outlet conduit, a first collection conduit connected to all of said outlet conduits except that of said bag filter, a second collection conduit connected to said bag filter and discharging into said discharge conduit upstream of said precipitator, separate means comprising a motor for moving carbon black through each of said collection conduits, a power source, means responsive to a predetermined level of carbon black in said precipitator and each of said separators except said bag filter for energizing the motor of the carbon black feeder in its respective outlet conduit and the motor of the means for moving carbon black through said first collection conduit from said power source, and means responsive to a predetermined level in said bag filter for energizing the motor of the carbon black feeder in the bag filter outlet conduit and the motor of the means for moving carbon black through said second collection conduit.

23. A carbon black collecting and conveying system, comprising in combination, a source of a gaseous effluent containing suspended carbon black, a discharge conduit connecting said source with an outlet downstream therefrom, an electrical precipitator connected downstream of said source in said discharge conduit, a plurality of carbon black separators connected in series in said discharge conduit downstream of said precipitator, the last of said separators in a downstream direction being a bag filter, each separator and said precipitator comprising a gravity collection chamber and an outlet conduit for carbon black and adapted to separate some of the carbon black from said effluent, a carbon black feeder in each of said outlet conduits to control flow of carbon black through said outlet conduits and thereby the level of carbon black chambers, a first collection conduit connected to all of said outlet conduits except that of said bag filter, a second collection conduit connected to said outlet conduit of said bag filter and discharging into said discharge conduit upstream of said precipitator, separate means for moving carbon black in each of said collection conduits, each of said separate means comprising a source of gas comprising a gas supply conduit connecting respective said collection conduits to said discharge conduit and a gas blower in each of said collection conduits for moving said carbon black from said outlet conduits through said collection conduits from said gas supply conduit, said first collection conduit connected to a carbon black collector downstream of said outlet conduit for collecting some of the carbon black being moved in said first collection conduit, a bleed conduit connected to said first collection conduit downstream of said carbon black collector and connected to said discharge conduit upstream of said precipitator, and means in each of said chambers actuated by the level of carbon black therein for actuating a predetermined level of carbon black above said carbon black feeders.

24. A carbon black collecting and conveying system, comprising in combination, a source of a gaseous effluent containing suspended carbon black, a discharge conduit connecting said source with an outlet downstream therefrom, an electrical precipitator connected downstream of said source in said discharge conduit, a plurality of carbon black separators connected in series in said discharge conduit downstream of said precipitator, the last of said separators in a downstream direction being a bag filter, each separator and said precipitator comprising a gravity collection chamber and an outlet conduit for carbon black and adapted to separate some of the carbon black from said effluent, a carbon black feeder in each of said outlet conduits to control flow of carbon black through said outlet conduits and thereby the level of carbon black chambers, a first collection conduit connected to all of said outlet conduits except that of said bag filter, a second collection conduit connected to said outlet conduit of said bag filter, separate means for moving carbon black in each of said collection conduits, each of said separate means comprising a source of gas comprising a gas supply conduit connecting respective said collection conduits to said discharge conduit and a gas blower in each of said collection conduits for moving said carbon black from said outlet conduits through said collection conduits from said gas supply conduit, said first and second collection conduits connected to a carbon black collector downstream of said outlet conduits for collecting some of the carbon black being moved in said first and second collection conduits, a bleed conduit connected to said first collection conduit downstream of said carbon black collector and connected to said discharge conduit upstream of said precipitator, and means in each of said chambers actuated by the level of carbon black therein for actuating said carbon black feeders to maintain a predetermined level of carbon black above said carbon black feeders.

25. A carbon black collecting and conveying system, comprising in combination, a source of a gaseous effluent containing suspended carbon black, a discharge conduit connecting said source with an outlet downstream therefrom, an electrical precipitator connected downstream of said source in said discharge conduit, a plurality of carbon black separators connected in series in said discharge conduit downstream of said precipitator, the last of said separators in a downstream direction being a bag filter, each separator and said precipitator comprising a gravity collection chamber and an outlet conduit for carbon black and adapted to separate some of the carbon black from said effluent, a carbon black feeder in each of said outlet conduits to control flow of carbon black through said outlet conduits and thereby the level of carbon black chambers, a first collection conduit connected to all of said outlet conduits except that of said bag filter, a second collection conduit connected to said outlet conduit of said bag filter, separate means for moving said carbon black from said outlet conduits in each of said collection conduits, said first and second collection conduits connected to a carbon black collector downstream of said outlet conduits for collecting some of the carbon black being moved in said first and second collection conduits, and means in each of said chambers actuated by the level of carbon black therein for actuating said carbon black feeders to maintain a predetermined level of carbon black above said carbon black feeders.

26. The combination of claim 12 in which said carbon black feeder is driven by a first motor, said means for moving said carbon black through said collection outlet is driven by a second motor, and said means actuated by the level of carbon black in said chamber actuates both said motors simultaneously by connecting them both in parallel to a source of power, said second motor adapted to be inactivated a short period of time after inactivation of said first motor.

27. The combination of claim 10 in which said gas blower is operatively adapted to continue to move said carbon black in said collection conduit a short period of time after inactivation of said carbon black feeder.

28. The combination of claim 10 in which said gas blower continuously moves carbon black in said collection conduit.

References Cited in the file of this patent

UNITED STATES PATENTS

| | | |
|---|---|---|
| 1,935,843 | Goebels | Nov. 21, 1933 |
| 2,368,828 | Hansen | Feb. 6, 1945 |
| 2,391,863 | Bowen | Jan. 1, 1946 |
| 2,437,352 | Fragen | Mar. 9, 1948 |
| 2,515,371 | Jewell | July 18, 1950 |

FOREIGN PATENTS

| | | |
|---|---|---|
| 510,580 | Great Britain | Aug. 3, 1939 |
| 845,744 | Germany | Aug. 4, 1952 |